United States Patent [19]
Kanetake et al.

[11] Patent Number: 5,351,320
[45] Date of Patent: Sep. 27, 1994

[54] OPTICAL MODULATOR DEPRESSING OPTICAL FEEDBACK AND OPTICAL MODULATING ELEMENT AND CHANNEL OPTICAL WAVEGUIDE USED THEREFORE

[75] Inventors: Tatsuo Kanetake, Kokubunji; Masashi Kiguchi, Saitama; Yoshio Taniguchi, Hino, all of Japan

[73] Assignee: Hitachi, Ltd., Tokyo, Japan

[21] Appl. No.: 82,220

[22] Filed: Jun. 24, 1993

[30] Foreign Application Priority Data

Jun. 25, 1992 [JP] Japan .................................. 4-167227

[51] Int. Cl.$^5$ .............................................. G02B 6/10
[52] U.S. Cl. ......................................... 385/8; 257/13; 257/97; 385/130
[58] Field of Search ........................ 385/2, 3, 4, 8, 14, 385/130; 257/12, 14, 13, 21, 97

[56] References Cited

U.S. PATENT DOCUMENTS

| | | | |
|---|---|---|---|
| 4,869,569 | 9/1989 | Kapon | 385/2 |
| 4,943,133 | 7/1990 | Deri et al. | 385/3 |
| 5,048,907 | 9/1991 | Wickman et al. | 385/2 |
| 5,090,790 | 2/1992 | Zucker | 385/130 |

OTHER PUBLICATIONS

"Quadratic electro-optic light Modulator in a GaAs-/AlGaAs Multiquantum Well Heterostructure Near the Excitonic Gap" Phys. Lett. vol. 48, No. 15, Apr. 14, 1986 pp. 989-991.

"High-Speed Optical Modulation with GaAs/GaAlAs Quantum Wells in a p-i-n Diode Structure", Appl. Phys. Lett. 44, No. 1, Jan. 1, 1984, pp. 16-18.

"100 ps Wave Guide Multiple Quantum Well (MQW) Optical Modulator with 10:1 on/off Ration", Electron. Lett. 21 (1985), pp. 693-694.

"High-Speed III-V Semiconductor Intensity Modulators", IEEE J. of Quantum Electronics, vol. 27, No. 3, Mar. 1991, pp. 654-667.

*Primary Examiner*—Akm E. Ullah
*Attorney, Agent, or Firm*—Kenyon & Kenyon

[57] ABSTRACT

An optical modulating element has a core layer and first and second cladding layers sandwiching the core layer. The core layer is made of one or semiconductors belonging to a point group $\overline{4}3m$ or $\overline{4}2m$, and has $TM_{00}$ and $TE_{00}$ propagation modes. The direction of light of said $TM_{00}$ and $TE_{00}$ propagation modes is parallel to the [110] or [−110] direction of crystal orientation. The change amount of an index of refraction of the core layer caused by the application of an electric field to the core layer in the direction parallel to the [001] direction is different for the two propagation modes.

9 Claims, 7 Drawing Sheets

OPTICAL MODULATOR DEPRESSING OPTICAL FEEDBACK AND OPTICAL MODULATING ELEMENT AND CHANNEL OPTICAL WAVEGUIDE USED THEREFORE

BACKGROUND OF THE INVENTION

1. Field of the invention

The present invention relates to an optical intensity modulator used in optical fiber communications or the like. Such a monitor controls the output intensity of incident coherent light with an electrical signal. The present invention is also directed to an optical modulating element and channel optical waveguide for such an optical intensity modulator.

2. Description of the Related Art

In the field of optical communications, a technique of controlling the light intensity at high speed by an electrical signal is being developed intensively in hopes of future key technology. The following two approaches are mainly investigated as the means of realizing high speed optical intensity modulation.

One approach is to directly modulate the drive current of a semiconductor laser used as a light source. Although this system is simple in structure, a change in the laser oscillation state, particularly the broadening of width of a laser oscillating wavelength, occurs inherently because the drive current of a semiconductor layer is turned on and off. This broadening (chirping) of a laser oscillating wavelength results in a limit of light transmission distance because of the wavelength dispersion in an optical fiber, posing a serious issue for long distance transmission.

Another approach to high speed light intensity modulation is to use an electrooptic intensity modulator which controls the intensity cf light radiated from a light source. Devices using ferroelectric material such as lithium niobate or using multiple quantum wells (MQWs) of semiconductor superlattice have been reported. The latter devices have a performance far superior to the former devices, and have been greatly researched. An MQW optical intensity modulating element using excitonic absorption was reported in Wood T. H., Burrus Jr. C. A., Miller D. A. B. , Chemla D. S. , Damen T. C., Gossard A. C., and Wiegmann W "High-Speed Optical Modulation with GaAs/GaA1As Quantum Wells in a p-i-n Diode Structure", Appl. Phys. Lett. 44, No. 1, Jan. 1, 1984, pp. 16–18. This element showed a response speed of about 100 ps and a modulation factor of 20 to 30%. Another element was also reported which used a waveguide structure and showed an upper limit frequency of 10 GHz or higher and a modulation factor over 90% (for example, refer to Wood T. H. , Burrus C. A., Tucker R. S., Weiner J. S. , Miller D. A. B. , Chemla D.S. , Damen T .C. , Gossard A. C., and Wiegmann W., "100 ps Waveguide Multiple Quantum Well (MQW) Optical Modulator with 10:1 on/off ratio", Electron. Lett. 21 (1985), pp. 693–694).

These elements using a change in excitonic absorption by the application of an external electric field also present a problem for long distance transmission over an optical fiber. Namely, the refraction index is changed if the carrier frequency is set near the exciton resonance frequency at which an external electric field can change the optical absorption greatly so that the modulation factor can be raised easily. A change in absorption along with the refraction index with time causes the broadening of carrier and subband frequencies (wavelength chirping) and hence the wavelength dispersion in an optical fiber, resulting in a limit transmission distance.

With an interferometer structure, a sufficient modulation factor can be obtained by using only a change in the refraction index by the application of an external electric field. An example of such an optical intensity modulator using a Mach-Zehnder interferometer made of an optical waveguide is described in Walker R. G., "High-Speed III-V Semiconductor Intensity Modulators", IEEE J. of Quantum Electronics, Vol. 27, No. 3, March 1991, pp. 654–667. This modulator was reported that it showed an upper limit frequency of about 36 GHz.

SUMMARY OF THE INVENTION

The above-described methods of manufacturing an optical modulating element do not consider reducing a feedback light to the light source. In an optical modulating element structured with an optical waveguide in particular, incident light is reflected at the output facet of the element and becomes feedback light.

If the intensity of such a feedback light exceeds about 0.1% of the semiconductor laser output, the operation state of the laser becomes unstable. In such a case, it is known that a change in oscillation frequency such as mode hopping or an increase of noise at the lower frequency band may occur.

It is needless to say that such a phenomenon is not desirable for optical communications. Therefore, in configuring the optical system, an optical isolator is required to be placed between a semiconductor laser as a carrier wave light source and an optical modulating element. Such an optical isolator is very expensive, and the addition of the isolator increases the number of components of the system.

The present invention provides an optical modulating element capable of being manufactured with a simple method and having a feedback light sufficiently small even if an optical isolator is not used.

The present invention also provides an optical intensity modulator having an optical modulating element with a greatly simplified structure as compared to a conventional modulator using a Mach-Zehnder interferometer and optical waveguiding regions, while having performance equal to or better than the conventional modulator.

It is a further object of the present invention to provide an optical modulating element and channel optical waveguide suitable for configuring an optical modulator.

According to one embodiment of the present invention there is provided an optical modulating element having a core layer and first and second cladding layers sandwiching the core layer. The core layer is made of one or more semiconductors belonging to a point group $\overline{4}3m$ or $\overline{4}2m$ and has $TM_{00}$ and $TE_{00}$ propagation modes. The propagation direction of light of the $TM_{00}$ and $TE_{00}$ propagation modes is parallel to the [110] or [−110] direction of crystal orientation, and the change amount of an index of refraction of the core layer caused by the application of an electric field to the core layer in the direction parallel to the [001]direction is different for the two propagation modes.

The core layer may be selected from the group consisting of: (a) a superlattice layer made of a gallium arsenide layer and a mixed crystal layer of aluminum arsenide and gallium arsenide, the superlattice layer having a heterojunction parallel to the (001) plane of crystal, (b) a superlattice layer made of a mixed crystal layer of indium arsenide and gallium arsenide and a mixed crystal layer of indium arsenide and aluminum arsenide, the superlattice layer having a heterojunction parallel to the (001) plane of crystal, and (c) a superlattice layer made of a mixed crystal layer of indium arsenide and gallium arsenide and an indium phosphide layer, the superlattice layer having a heterojunction parallel to the (001) plane of crystal. The (001) plane is perpendicular to the [001]direction.

The optical modulating element may further include electrodes for applying an electric field to the core layer in the direction parallel to the [001]direction.

The core layer and said first and second cladding layers may constitute a p-i-n structure.

According to another embodiment of the present invention, there is provided an optical intensity modulator having an optical modulating element, a first quarter-wave plate disposed on the light input side of the optical modulating element, and a circular dichroic polarizer disposed on the light output side of the optical modulating element. The optical modulating element includes a core layer and first and second cladding layers sandwiching the core layer. The core layer is made of one or more semiconductors belonging to a point group $\overline{4}3m$ or $\overline{4}2m$, and has $TM_{00}$ and $TE_{00}$ propagation modes. The propagation direction of light of the $TM_{00}$ and $TE_{00}$ propagation modes is parallel to the [110] or [−110] direction of crystal orientation, and the change amount of an index of refraction of the core layer caused by the application of an electric field to the core layer in the direction parallel to the [001] direction is different for the two propagation motes.

The circular dichroic polarizer may include a second quarter-wave plate and a linear polarizer.

The core layer may be selected from the above-described groups (a) to (c) similar to the core layer of the first embodiment optical modulating element.

The optical intensity modulator may include electrodes for applying an electric field to the core layer in the direction parallel to the [001] direction.

The core layer and first and second cladding layers may constitute a p-i-n structure.

The optical intensity modulator may further include a substrate on which the optical modulating element and first and second quarter-wave plates are formed.

The first quarter-wave plate includes a second core layer and third and fourth cladding layers sandwiching the second core layer, wherein the second core layer may be structured such that it has the $TM_{00}$ and $TE_{00}$ propagation modes, and that the waveguide length of the second core layer is set such that the phase difference of light of the two propagation modes passed through the second core layer has a predetermined value.

The second quarter-wave plate includes a third core layer and fifth and sixth cladding layers sandwiching the third core layer, wherein the third core layer may be structured such that it has the $TM_{00}$ and $TE_{00}$ propagation modes, and that the waveguide length third core layer is set such that the phase difference of light of the two propagation modes passed through the third core layer has a predetermined value.

According to another aspect of the present invention, there is provided a channel optical waveguide including a core layer and first and second cladding layers sandwiching the core layer. The core layer has $TM_{00}$ and $TE_{00}$ propagation modes, and the waveguide length of the core layer is set such that the phase difference of light of the two propagation modes passed through the core layer has a predetermined value.

DETAILED DESCRIPTION

An optical intensity modulator and an optical modulating element and channel waveguide for the modulator of the present invention will be described with reference to the accompanying drawings.

Prior to the description of the embodiments of the present invention, the principle of the invention will be first explained.

The optical waveguiding region (core layer) of an optical modulating element of the present invention is made of one or more semiconductors belonging to a point group $\overline{4}3m$ by International Symbol ($T_d$ by Schoenflies Symbol) or $\overline{4}2m$ ($D_{2d}$ by Schoenflies Symbol). One or more bulk semiconductors include gallium arsenide; gallium phosphide; aluminum arsenide; aluminum phosphide; indium phosphide; a mixed crystal of gallium arsenide and aluminum arsenide; a (quaternary) mixed crystal of indium, gallium, arsenide and phosphor; zinc telluride; cadmium telluride; and so on. Two or more semiconductors belonging to the point group $\overline{4}3m$ or $\overline{4}2m$ include (a) a superlattice layer made of a gallium arsenide layer and a mixed crystal layer of aluminum arsenide and gallium arsenide, the superlattice layer having a heterojunction parallel to the (001) plane of crystal, (b) a superlattice layer made of a mixed crystal layer of indium arsenide and gallium arsenide and a mixed crystal layer of indium arsenide and aluminum arsenide, the superlattice layer having a heterojunction parallel to the (001) plane of crystal, (c) a superlattice layer made of a mixed crystal layer of indium arsenide and gallium arsenide and an indium phosphide layer, the superlattice layer having a heterojunction parallel to the (001) place of crystal, and other semiconductors. These superlattices macroscopically have a symmetry with the point group $\overline{4}2m$ so that they can be used as the material of the optical waveguiding region (core layer) of the optical modulating element of the present invention.

Figure 1A:
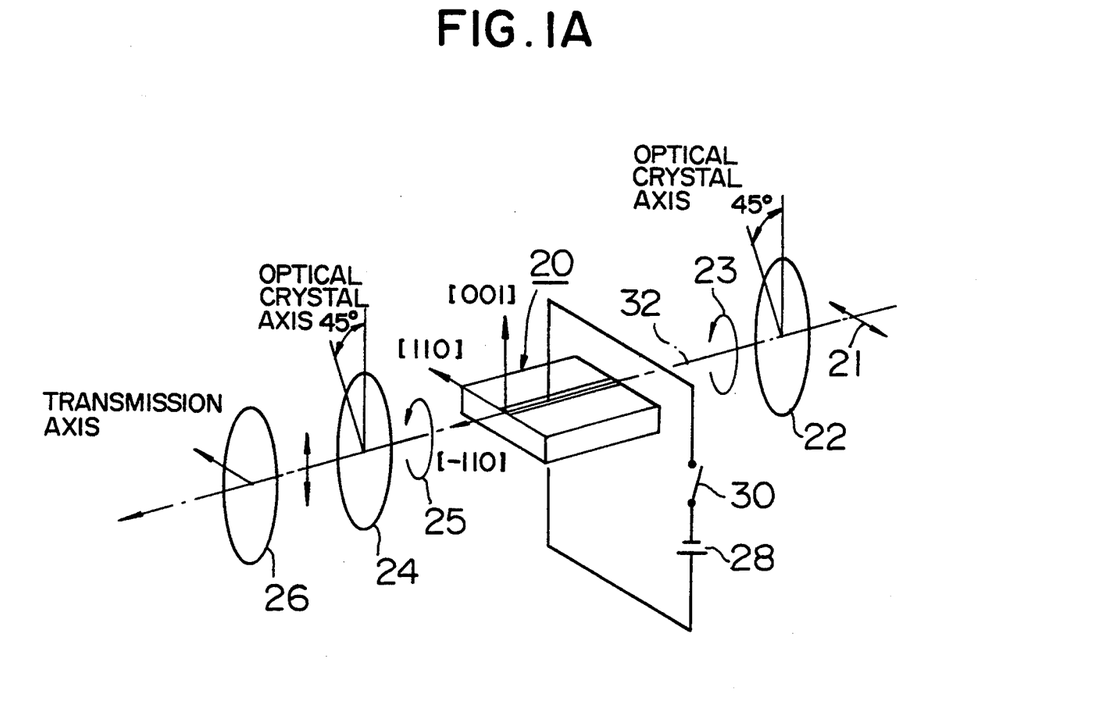
FIG. 1A is a diagram illustrating the polarization state of light when an external electric field is not applied, in an optical intensity modulator according to an embodiment of the present invention.
Figure 1B:
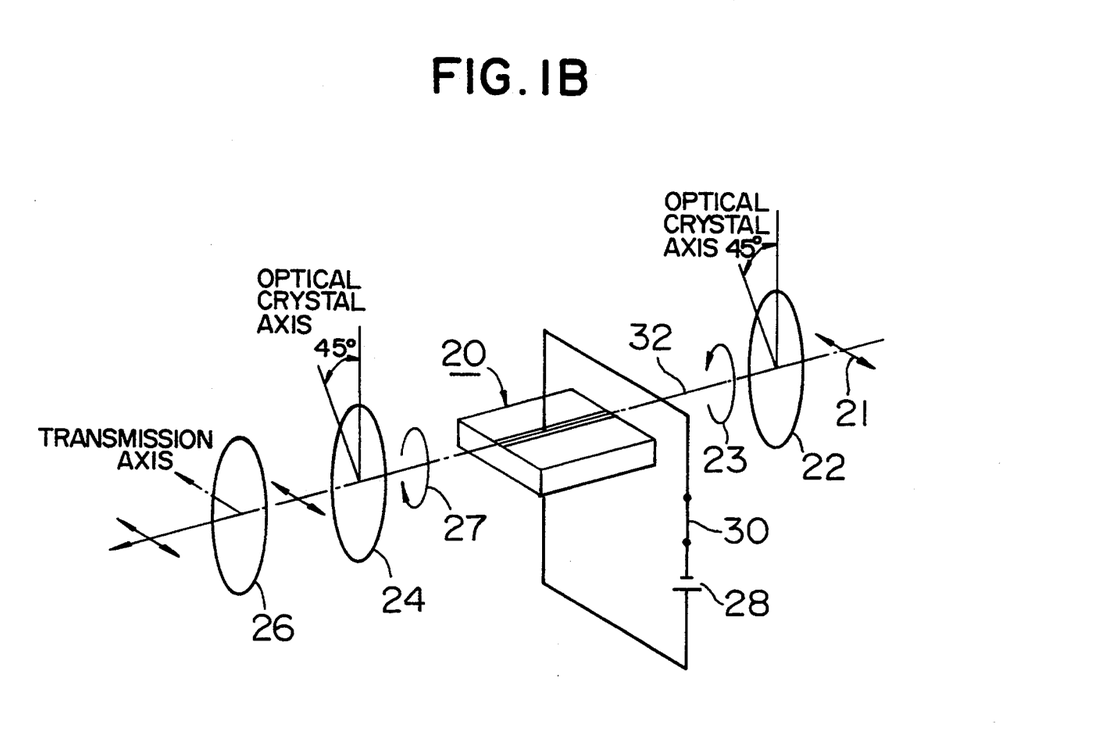
FIG. 1B is a diagram illustrating the polarization state of light when an external electric field is applied, in the optical intensity modulator.

FIGS. 1A and 1B show an example of the structure of an optical intensity modulator according to the present invention. Prior to giving the detailed description of the principle of optical intensity modulation of the present invention and its advantages, an optical waveguide as an optical modulating element will first be described.

Figure 2A:
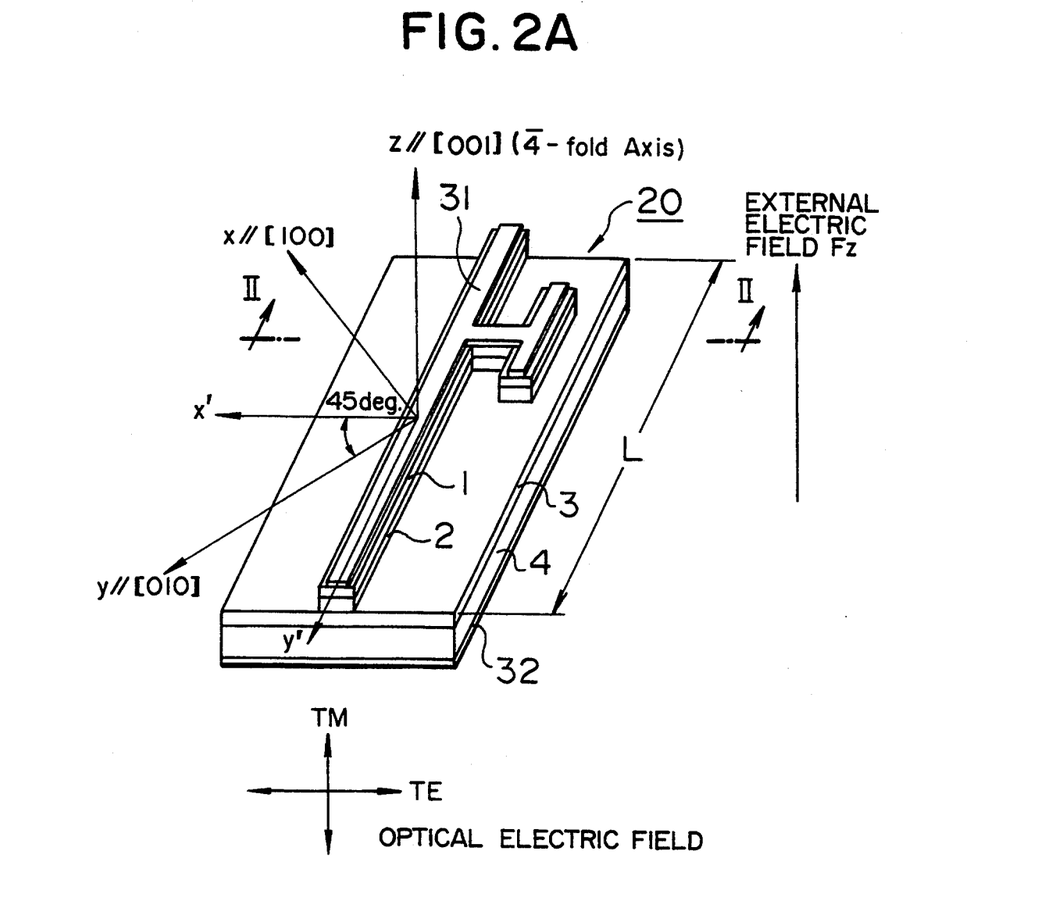
FIG. 2A is a perspective view of an optical modulating element used for the optical intensity modulator, according to another embodiment of the present invention.
Figure 2B:
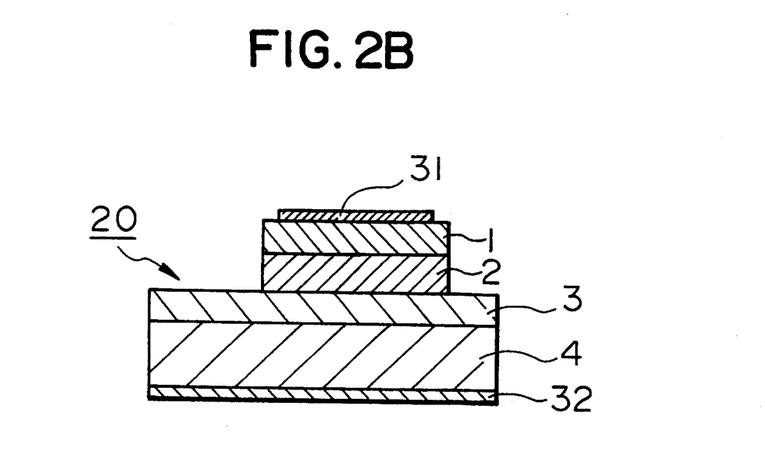
FIG. 2B is a cross sectional view of the optical modulating element along a line II—II of FIG. 2A.

A geometrical pattern of the optical waveguide is illustratively shown in FIG. 2A. FIG. 2B is a cross sectional view of the optical waveguide shown in FIG. 2A. Referring to FIGS. 2A and 2B, a channel layer (core layer) 2 forming an optical waveguiding path or region is sandwiched between a cladding layer 1 of p-type semiconductor and another cladding layer 3 of n-type semiconductor, forming a p-i-n structure. An external electric field is applied to the channel layer 2 from between the cladding layers 1 and 3. In this example, a bias is applied between electrodes 31 and 32 to generate the external electric field. The optical waveguide is formed on a substrate 4. The optical waveguide is formed by semiconductor belonging to a point group $\overline{4}3m$ or $\overline{4}2m$. For example, the p-type semiconductor cladding layer 1 is a mixed crystal layer of p-doped GaAlAs, the n-type semiconductor cladding layer 3 is a mixed crystal layer of n-doped GaAlAs, the channel layer 2 is a superlattice layer of GaAs and GaAlAs, and the substrate 4 is a GaAs substrate.

The direction of light propagation in the optical waveguide is parallel to the [110] or [−110] direction of crystal orientation. In this example, light propagates in the [−110] direction (y' axis direction ). The external modulating electric field is applied in the direction parallel to the [001] direction (4-fold axis direction).

The linear and quadratic electrooptic tensor $\tilde{\gamma}$ and $\tilde{g}$ of semiconductors forming the waveguiding region and belonging to the point group $\overline{4}2m$ are given by the following equations (1) and (2):

$$\tilde{\gamma} = \begin{bmatrix} 0 & 0 & 0 \\ 0 & 0 & 0 \\ 0 & 0 & 0 \\ \gamma_{41} & 0 & 0 \\ 0 & \gamma_{41} & 0 \\ 0 & 0 & \gamma_{63} \end{bmatrix} ; \text{for } D_{2d}(\overline{4}2m) \quad (1)$$

$$\tilde{g} = \begin{bmatrix} g_{11} & g_{12} & g_{13} & 0 & 0 & 0 \\ g_{21} & g_{11} & g_{13} & 0 & 0 & 0 \\ g_{31} & g_{31} & g_{33} & 0 & 0 & 0 \\ 0 & 0 & 0 & g_{44} & 0 & 0 \\ 0 & 0 & 0 & 0 & g_{44} & 0 \\ 0 & 0 & 0 & 0 & 0 & g_{66} \end{bmatrix} ; \text{for } D_{2d}(\overline{4}2m) \quad (2)$$

For semiconductors belonging to the point group $\overline{4}3m$, the relationship given by the following equation (3) is also met between tensor components the equations (1) and (2):

$$\gamma_{63} = \gamma_{41}, \quad (3)$$

-continued
$$g_{12} = g_{13}, g_{21} = g_{31}, g_{33} = g_{11}, g_{66} = g_{44}; \text{for } T_d(\overline{4}3m)$$

The equations (1) and (2) can be used by semiconductor materials belonging to the point group $\overline{4}3m$ if the tensor elements are replaced as defined by the equation (3).

When the external electric field is applied parallel to the [001] direction (4-fold axis direction), the equation representing the index ellipsoid of semiconductor material forming the waveguiding region 2 changes from the following equation (4) to the equation (5):

$$\frac{x^2}{n_0^2} + \frac{y^2}{n_0^2} + \frac{z^2}{n_e^2} = 1 \quad (4)$$

$$\left(\frac{1}{n_0^2} + \frac{1}{2} g_{13} F_z^2\right) x^2 + \left(\frac{1}{n_0^2} + \frac{1}{2} g_{13} F_z^2\right) y^2 + \left(\frac{1}{n_e^2} + \frac{1}{2} g_{33} F_z^2\right) z^2 + 2\gamma_{63} F_z xy = 1 \quad (5)$$

The equation (5) is transformed into the equation (6) by using the coordinate system (x', y', z) rotated by 45° about the z axis:

$$\left(\frac{1}{n_0^2} + \frac{1}{2} g_{13} F_z^2 + \gamma_{63} F_z\right) x'^2 + \left(\frac{1}{n_0^2} + \frac{1}{2} g_{13} F_z^2 - \gamma_{63} F_z\right) y'^2 + \left(\frac{1}{n_e^2} + \frac{1}{2} g_{33} F_z^2\right) z^2 = 1 \quad (6)$$

The equation (4) represents the index ellipsoid when the external electric field $F_z$ is not applied, and the equations (5) and (6) represent the index ellipsoid when the field $F_z$ is applied.

The equation (6) indicates that the dielectric principal axes x', y' and z will not change even when the external electric field $F_z$ is applied, ensuring that the coupling between TE and TM modes will not occur even while the external electric field $F_z$ is applied. As seen from the equation (6), the refraction indices (roots of dielectric tensor components along the principal axes) $n_{x'}$, $n_{y'}$, and $n_z$ of the waveguiding region 2 change with the application of the external electric field $F_z$ as given by the following equations (7), (8) and (9):

$$n_{x'} = n_0 - \frac{1}{2} n_0^3 \left(\gamma_{63} F_z + \frac{1}{2} g_{13} F_z^2\right) \quad (7)$$

$$n_{y'} = n_0 - \frac{1}{2} n_0^3 \left(-\gamma_{63} F_z + \frac{1}{2} g_{13} F_z^2\right) \quad (8)$$

$$n_z = n_e - \frac{1}{2} n_e^3 \frac{1}{2} g_{33} F_z^2 \quad (9)$$

where $n_o$ and $n_e$ are refraction indices of semiconductor material forming the waveguiding region 2, relative to the ordinary ray and extraordinary ray, respectively. Representing the waveguide length as L, the phase shift amounts $\Delta\phi_{TE}$ and $\Delta\phi_{TM}$ of light of TE and TM modes propagating in the [−110] direction are given by the following equations (10) and (11) when the external electric field Fz is applied:

$$\Delta\phi_{TE} = -\frac{\pi L}{\lambda} n_0^3 \left( \gamma_{63} F_z + \frac{1}{2} g_{13} F_z^2 \right) \Gamma_{TE}, \quad (10)$$

for [−110] propagation $$\Delta\phi_{TM} = -\frac{\pi L}{\lambda} n_e^3 \frac{1}{2} g_{33} F_z^2 \Gamma_{TM} \quad (11)$$

where $\lambda$ represents the wavelength of incident light.

When the light propagates in the [110] direction, the phase shift amount $\Delta\phi_{TE}'$ of the light of TE mode is given by the following equation (12), and the phase shift amount $\Delta\phi_{TM}'$ of the light of TM mode is the same as $\Delta\phi_{TM}$ given by the equation (11):

$$\Delta\phi_{TE}' = -\frac{\pi L}{\lambda} n_0^3 \left( -\gamma_{63} F_z + \frac{1}{2} g_{13} F_z^2 \right) \Gamma_{TE}, \quad (12)$$

for [110] propagation where $\Gamma_{TE}$ and $\Gamma_{TM}$ are constants determined by the structure of the waveguiding region 2.

The difference of the phase shifts between TE and TM modes by the application of the external electric field can be used to configure an optical modulating element which changes the polarization state of incident light by the application of the external electric field. For example, if the waveguide length L is set to satisfy the following equation (13), where $\beta_{TE}$ and $\beta_{TM}$ are propagation constants for TE and TM modes, respectively, and m is an integer:

$$2\pi m = L(\beta_{TE} - \beta_{TM}) \quad (13)$$

a right-handed (left-handed) circularly polarized light incident to the waveguide is outputted as the same right-handed (left-handed) circularly polarized light, when the external electric field is not applied.

When the external electric field Fz is applied to the waveguiding region 2, the phase difference $\Delta\phi$ or $\Delta\phi'$ of light between TE and TM modes is generated as given by the following equation (14) or (15), where $\Delta\phi$ represents the phase difference of light propagating in the [−110] direction, and $\Delta\phi'$ represents the phase difference of light propagating in the [110] direction:

$$\Delta\phi = \Delta\phi_{TE} - \Delta\phi_{TM} \quad (14)$$

$$= \frac{\pi L}{\lambda} \left( -\gamma_{63} F_z n_0^3 \Gamma_{TE} + \frac{1}{2} (g_{33} n_e^3 \Gamma_{TM} - g_{13} n_0^3 \Gamma_{TE}) F_z^2 \right);$$

for [−110] propagation $$\Delta\phi' = \Delta\phi_{TE}' - \Delta\phi_{TM}' \quad (15)$$

$$= \frac{\pi L}{\lambda} \left( -\gamma_{63} F_z n_0^3 \Gamma_{TE} + \frac{1}{2} (g_{33} n_e^3 \Gamma_{TM} - g_{13} n_0^3 \Gamma_{TE}) F_z^2 \right);$$

for [110] propagation

Upon application of the external electric field Fz having such an intensity as the phase difference becomes $\pi$ multiplied by an odd number, the light emitted from the waveguiding region becomes a circularly polarized light rotating in the opposite direction of the incident light. It is therefore possible to control the transmitted light intensity by the external electric field by providing a circular dichroic polarizer on the output side of the optical modulating element. With such an arrangement, the amount of feedback light reduces as will be described later, it is unnecessary to provide an optical isolator.

FIGS. 1A and 1B show an example of the structure of an optical intensity modulator designed to reduce an optical loss as much as possible following the above-described principle.

Referring to FIGS. 1A and 1B, reference numeral 20 represents an optical modulating element having the optical waveguiding region shown in FIGS. 2A and 2B. Quarter-wave plates 22 and 24 are disposed on opposite sides of the optical modulating element 20. A linear polarizer 26 is disposed on the output side of the quarter-wave plate 24. A signal voltage source 28 and a switch 30 are provided to apply or not to apply the external electric field to the optical waveguiding region of the optical modulating element 20. Reference numeral 32 represents an optical path passing through the centers of the quarter-wave plate 22, waveguiding region of the optical modulating element 20, quarter-wave plate 24, and linear polarizer 26.

FIGS. 1A and 1B illustrates the polarization states with or without the external electric field Fz.

In this example, a linearly polarized light in the lateral direction (indicated by a line 21) without modulation passes through the quarter-wave plate 22 and is left-handed circularly polarized. This left-handed circularly polarized light is introduced into the optical waveguiding region. If the external modulating electric field Fz is not applied, the left-handed circularly polarized light in the optical waveguiding region is not affected and is outputted as the same left-handed circularly polarized light (indicated by a line 25) as shown in FIG. 1A, whereas if the external electric field Fz is applied, it becomes a right-handed circularly polarized light (indicated by a line 27) as shown in FIG. 1B.

The light outputted from the optical waveguiding region is incident to the circular dichroic polarizer constructed by the quarter-wave plate 24 and linear polarizer 26. If the outputted light is the left-handed circularly polarized light without the application of the external electric field, the light will not transmit through the circular dichroic polarizer. On the other hand, if the outputted light is the right-handed circularly polarized light with the application of the external electric field, it transmits through the circular dichroic polarizer and becomes a linearly polarized light in the vertical direction. In other words, an optical signal modulated by an electrical signal can be obtained.

In this case, the optical loss is only the absorption loss in the optical waveguiding region and a reflection loss at each facet of the element. Such an optical loss can be reduced sufficiently by a proper design to be described later.

The transmission axis of the linear polarizer of the modulator may be set in the vertical direction. With such an optical intensity modulator, the outputted light passes through the linear polarizer when the external electric field is not applied, and it will not pass through the linear polarizer when the electric field is applied.

The quarter-wave plates 22 and 24 may be formed by using a channel optical waveguide having two waveguide modes $TM_{00}$ and $TE_{00}$ each having a different effective wavenumber (propagation constant), and by setting the optical waveguide path to a suitable length. Using such a quarter-wave plate, an integrated optical intensity modulator can be manufactured which will be later described with reference to FIG. 7.

That the optical intensity modulator constructed as above has performances equivalent to those of a conventional optical intensity modulator, will be described next.

The fundamental performance characteristics of a broad band optical intensity modulator include:

(1) a broad bandwidth with a flat frequency response characteristic;

(2) a small driving power;

(3) a small insertion loss relative to the optical system; and (4) a sufficiently small feedback light within the necessary frequency band.

As to the performance of the bandwidth, the response characteristic of a semiconductor superlattice to the external electric field is excellent over a broad frequency band higher than frequencies actually used. The main factor narrowing the broad band is only the response characteristic of electrodes from which the external electric field is induced. The response characteristic of electrodes can be improved the same degree as a conventional optical intensity modulator, by using micro strip line electrodes and applying the external electric field in the form of traveling wave in the similar manner as conventional.

The performance of the driving power becomes more effective than a conventional modulator for the following reason. In a conventional optical intensity modulator using a Mach-Zehnder interferometer in which separate light from two waveguiding regions are interfered and one of TE and TM modes is used, the phase shift amount caused by the application of the external electric field is given by any one of the equation (10) for TE mode propagating in the [−110] direction, the equation (11) for TM mode propagating in the [−110] or [110] direction, and the equation (12) for TE mode propagating in the [110] direction.

On the other hand, the modulator of this invention uses both TE and TM modes and the phase shift amounts between TE and TM modes by the application of the external electric field is given by the equation (14) for the propagation in the [−110] direction and by the equation (15) for the propagation in the [110] direction.

Figure 4A:
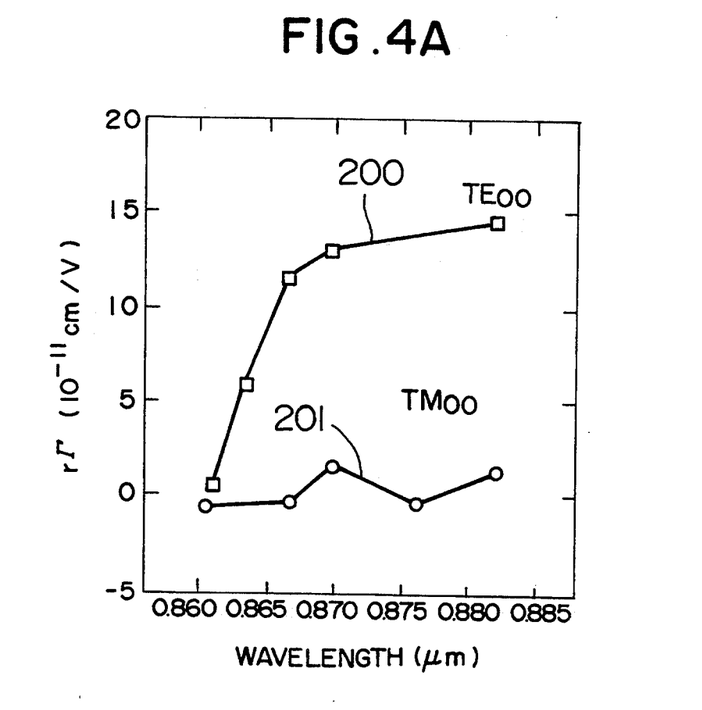
FIGS. 4A and 4B are graphs showing a dependency of GaAs/GaAlAs superlattice waveguide upon applied electric field, in the optical modulating element.
Figure 4B:
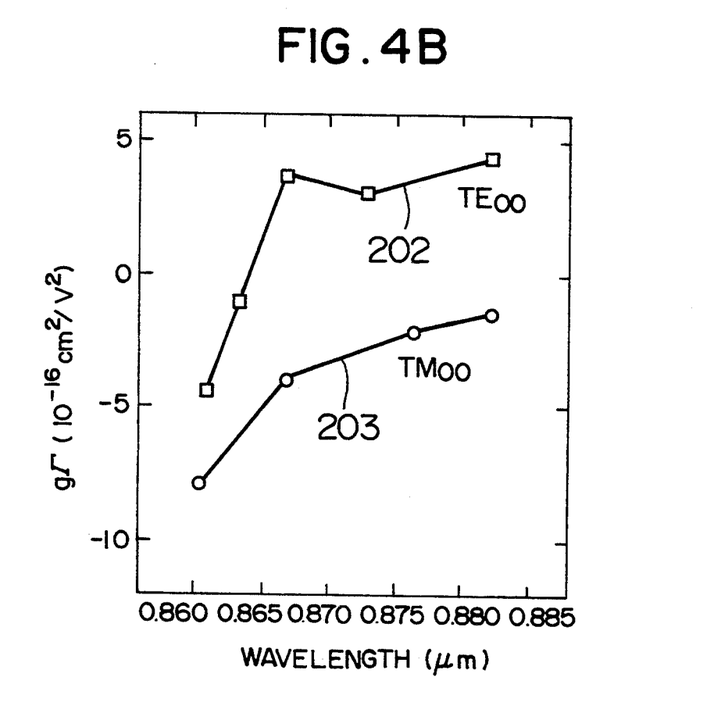

For example, for a waveguiding region of a superlattice made of gallium arsenide and a mixed crystal of aluminum arsenide and gallium arsenide, the values of tensor components at a wavelength 0.88 μm become $\gamma_{63}=3.0/10^{11}$ (cm²/V²), $g_{13}=1.2/10^{16}$ (cm²/V²), and $g_{33}=-0.6/10^{16}$ (cm²/V²) as will be seen from the measured data (dependency of electrooptic tensor upon wavelength for an optical modulating element 20) shown in FIGS. 4A and 4B of another embodiment to be described later. With these values, the phase shift amount given by the equation (14) becomes greater than that given by the equation (10), (11), or (12). Namely, it is possible for the optical intensity modulator of the present invention to efficiently produce the phase shift amount by an external electric field of smaller intensity than a conventional optical intensity modulator.

The insertion loss of the performance can be reduced sufficiently by a proper design of an optical system such as providing anti-reflection coating at the facets of the waveguiding region 2 shown in FIGS. 2A and 2B, or by properly setting the widths of quantum wells in the superlattice.

The performance of the feedback light becomes more advantageous over a conventional modulator. Namely, the structure of the modulator of the invention allows the feedback light intensity to be reduced greatly without using a particular optical isolator.

The first reason of the feedback light reducing capability is as follows. A reflected light at the input facet of the waveguiding region is a circularly polarized light rotated in the opposite direction to that of the incident light, and after passing through the quarter-wave plate it becomes a light linearly polarized in the direction perpendicular to the unmodulated incident light. As a result, the reflected light will not directly couple to the oscillation mode of the semiconductor laser.

The second reason is as follows. With a conventional optical modulator, the incident light to the waveguiding region is reflected 100% when the modulated output is zero. With the optical modulator of the invention, however, the modulated output is absorbed or refracted by the linear polarizer on the output side of the waveguide, without generating any feedback light.

Furthermore, with the optical modulator of the invention, it is not necessary to use a conventional complicated optical modulator using a Mach-Zehnder interferometer including an optical separator, two optical waveguiding regions, and an optical coupler, thereby reducing the number of manufacturing processes.

Figure 3A:
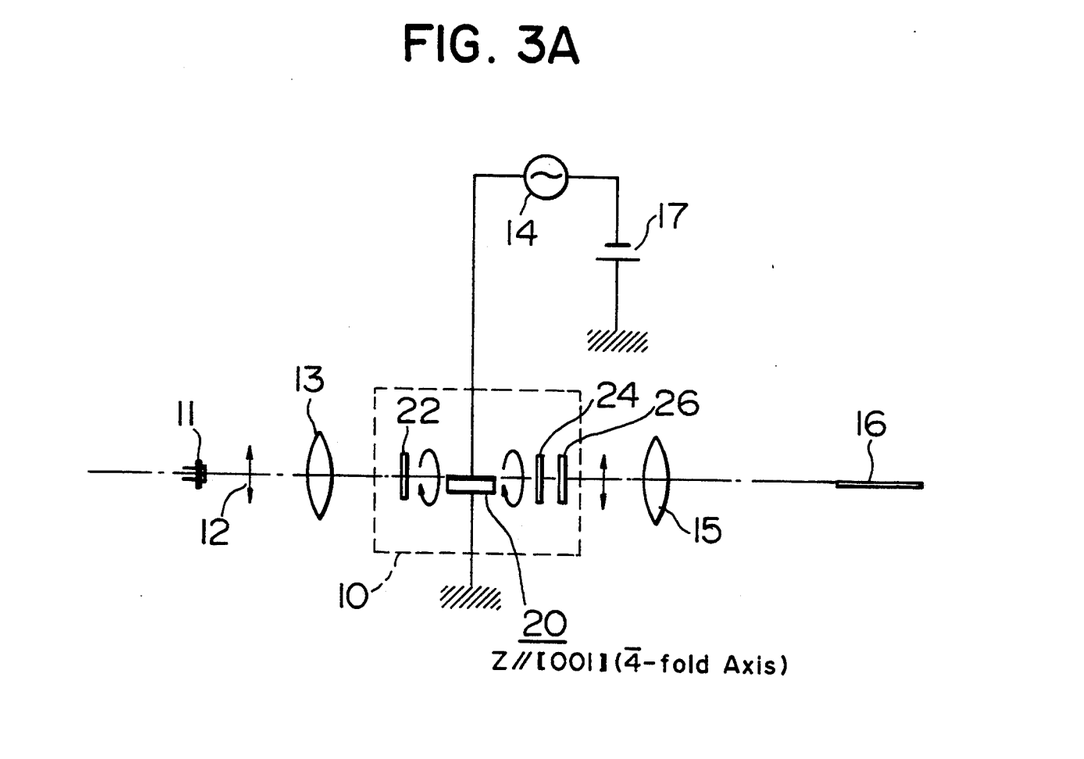
FIG. 3A is a diagram showing an example of an application of the optical intensity modulator.

FIG. 3A shows another embodiment of the optical intensity modulator according to the present invention applied to an optical communications system. A light polarized in an upright direction (indicated by an arrow 12) as viewed in FIG. 3A is applied via a coupling lens 13 to an optical modulator 10 formed in accordance with the principle described previously, and intensity modulated by an externally applied electrical signal 14. The intensity modulated light is incident via another coupling lens 15 to an optical fiber 16. As described with FIGS. 1A and 1B, the optical intensity modulator 10 is constructed of two parallel disposed quarter-wave plates 22 and 24 whose optical crystal axes are inclined by 45° relative to the direction perpendicular to the drawing sheet of FIG. 3A, a linear polarizer 26 whose transmission axis is in the upright direction as viewed in FIG. 3A, and an optical modulating element 20. Reference numeral 17 represents a d.c. power source for supplying a suitable bias voltage on which an electrical signal 14 is superposed. This d.c. power source 17 is used for adjustment so that the indices of the semiconductor material of the optical modulating element 20 relative to light of TE and TM modes fit into the operating point given by the equation 13. The optical modulating element 20 of this embodiment may be that shown in FIGS. 2A and 2B. The optical modulating element 20 used in this embodiment has the structure shown in FIG. 3B. Specifically, the optical modulating element 20 is of the laminated structure of a GaAs substrate 120 on which a superlattice layer (core layer) 122 made of GaAs and GaAlAs sandwiched between a p-doped GaAlAs layer (cladding layer) 121 and an n-doped GaAlAs layer (cladding layer) 123 is formed. Metal alloy layers 124 are formed on the upper surface of the n-doped GaAlAs layer 123 and the lower surface of the GaAs substrate 120, connection wires to an electrical signal being bonded to the metal alloy layers.

Figure 3B:
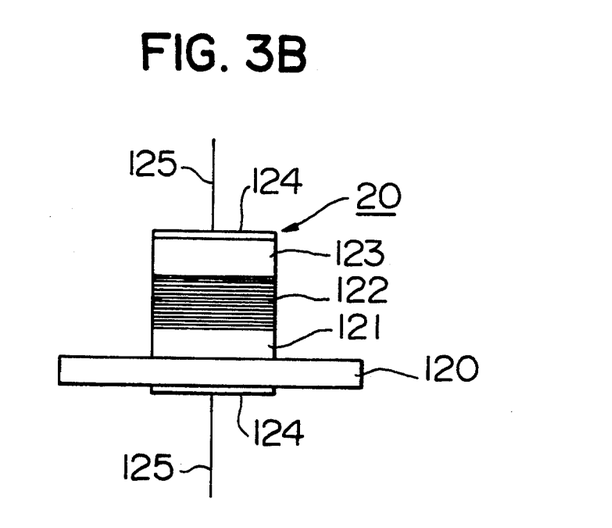
FIG. 3B is a cross sectional view showing another embodiment of the optical modulating element of the present invention.

FIGS. 4A and 4B show the measured results of the dependency of electrooptic tensor upon wavelength for the optical modulating element 20 manufactured and shown in FIG. 3B. The measurement was made by using the method described in M. Glick, F. K. Reinhart, G. Weimann, and W. Schlapp, "Quadric electro-optic light modulation in a GaAs/GaAlAs multiquantum well heterostructure near the excitonic gap", Appl., Phys., Lett., Vol. 48, No. 15, Apr. 14, 1986, pp. 989–991. The abscissa of FIG. 4A represents the wavelength, and the ordinate represents $\gamma\Gamma$. A curve 200 indicates $\gamma_{63}\Gamma_{TE}$ for $TE_{00}$ mode. Although $\gamma\Gamma$ for $TM_{00}$ mode should be zero in principle, the measured data within the measurement error was obtained as indicated by a curve 201 in FIG. 4A. Likewise, the abscissa of FIG. 4B represents the wavelength, and the ordinate represents $\gamma\Gamma$. A curve 202 indicates $g_{33}\Gamma_{TE}$ for $TE_{00}$ mode, and a curve 203 indicates $g_{13}\Gamma_{TM}$ for $TM_{00}$ mode. As seen from FIGS. 4A and 4B, the measured data presented relatively large electroptic constants. Another specimen manufactured under the same conditions was also measured which indicated that the indices $n_o$ and $n_e$ of refraction at the wavelength 0.88 $\mu$m were 3.528 and 3.522, respectively.

Figure 5:
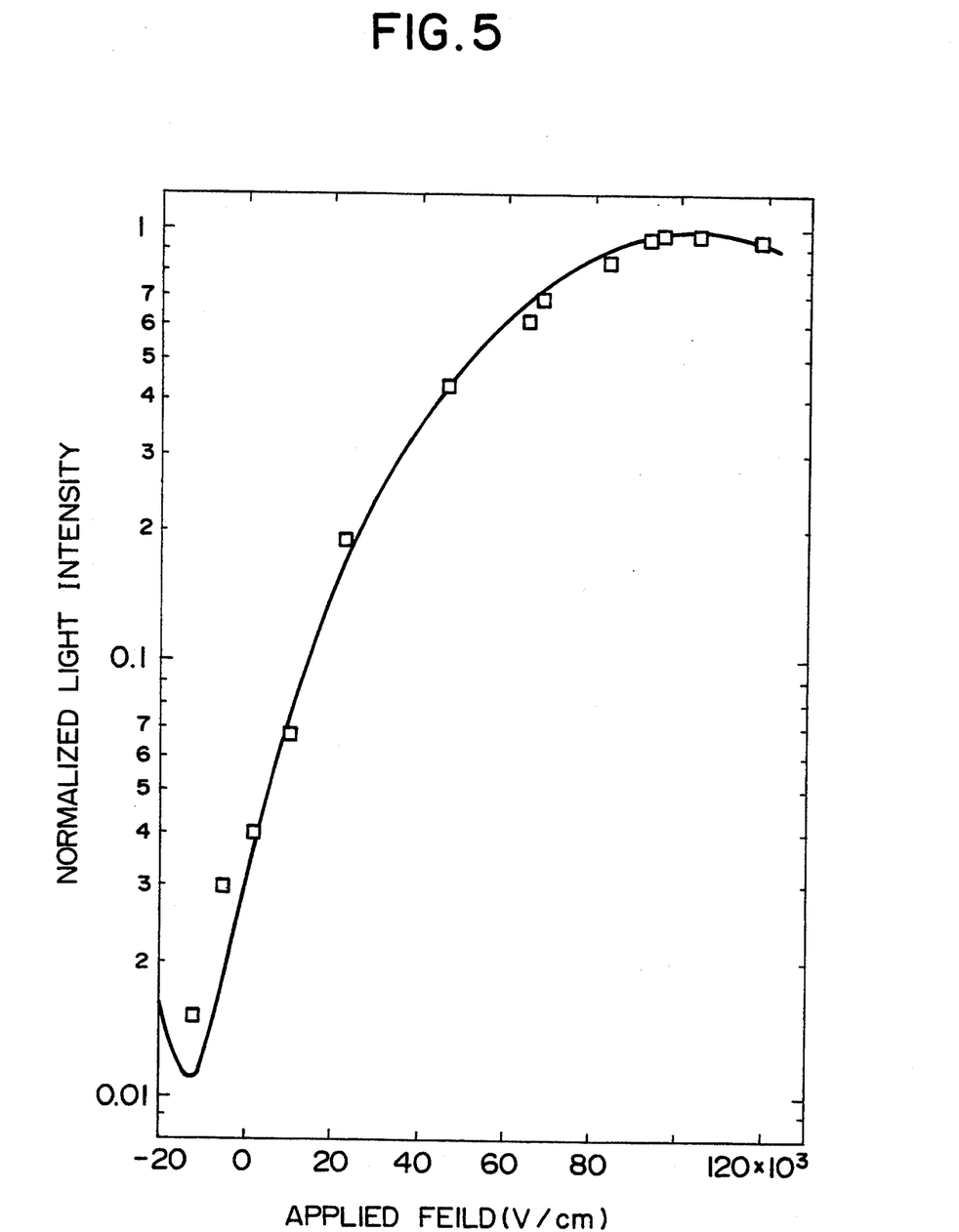
FIG. 5 shows a dependency of transmission light intensity upon applied electric field intensity, in an optical intensity modulator.

Using the optical modulating element having the above characteristic data, an optical modulator 10 was formed and the dependency of intensity of light having the wavelength 0.88 $\mu$m upon modulating external electric field was measured. The measured results are shown in FIG. 5 whose abscissa represents the intensity of the external electric field and ordinate represents the normalized light intensity. As the normalized light intensity, the intensity of maximum transmitted light is represented by "1". As seen from FIG. 5, the modulation factor in excess of 90% was obtained. When the quarter-wave plate 22 was anti-reflection coated, the intensity of feedback light to the modulator was about 0.1% of the incident light intensity.

Figure 6A:
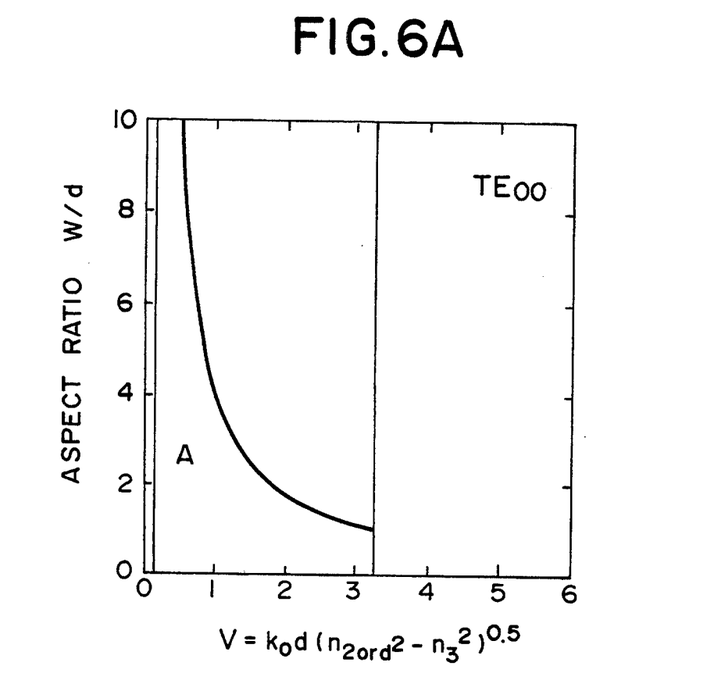
FIGS. 6A and 6B are graphs illustrating the conditions of manufacturing a single mode GaAlAs superlattice waveguide.
Figure 6B:
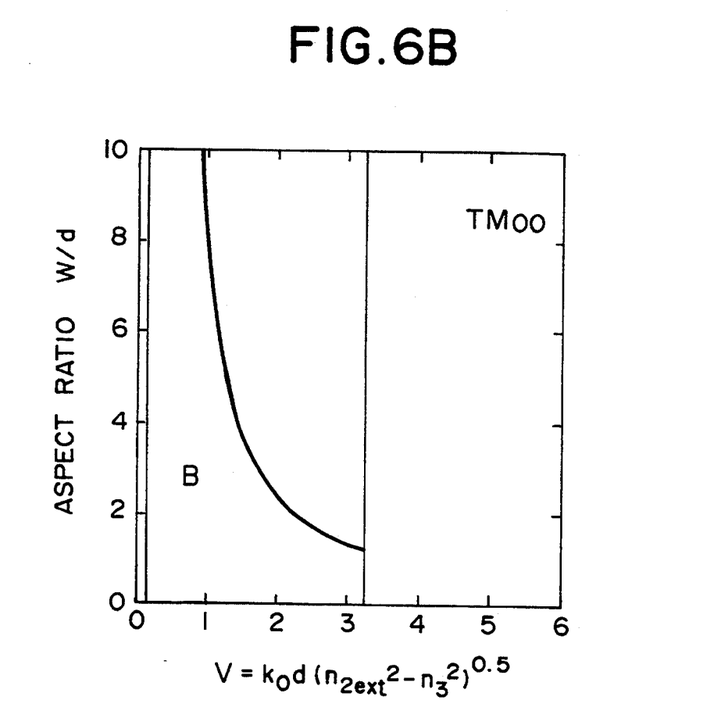

Another embodiment of the present invention will be described in which a compact size wave plate is formed by using a channel optical waveguide having two propagation modes $TM_{00}$ and $TE_{00}$ having a different wavenumber. In this embodiment, a quarter-wave plate is formed by properly setting the waveguide length. The structure of the waveguide is substantially the same as that shown in FIG. 3B, excepting the waveguide length. FIGS. 6A and 6B illustrate the conditions used for manufacturing a single mode GaAlAs waveguide allowing light to propagate only in 00 modes having a different polarization direction. In FIGS. 6A and 6B, the abscissa represents an effective wavenumber V which is related to the thickness d of the waveguide layer, and the ordinate represents an aspect ratio represented by the waveguide width w divided by the thickness d. FIG. 6A illustrates the conditions of $TE_{00}$ mode, and FIG. 6B illustrates the conditions of $TM_{00}$ mode. The conditions in areas A and B shown in FIGS. 6A and 6B realize a waveguide of a single mode. The common area of the areas A and B indicates the necessary manufacturing conditions. The waveguide was manufactured under the conditions of V=1.1 and the aspect ratio of 4. The waveguide length of the waveguide realizing the quarter-wave plate was about 70 $\mu$m. The components of the p-doped GaAlAs layer 121, superlattice layer 122, and n-doped GaAlAs layer 123 were set as p-$Ga_{0.7}Al_{0.3}As$, $Ga_{0.7}Al_{0.3}As$, and n-$Ga_{0.7}Al_{0.3}As$, respectively.

Figure 7:
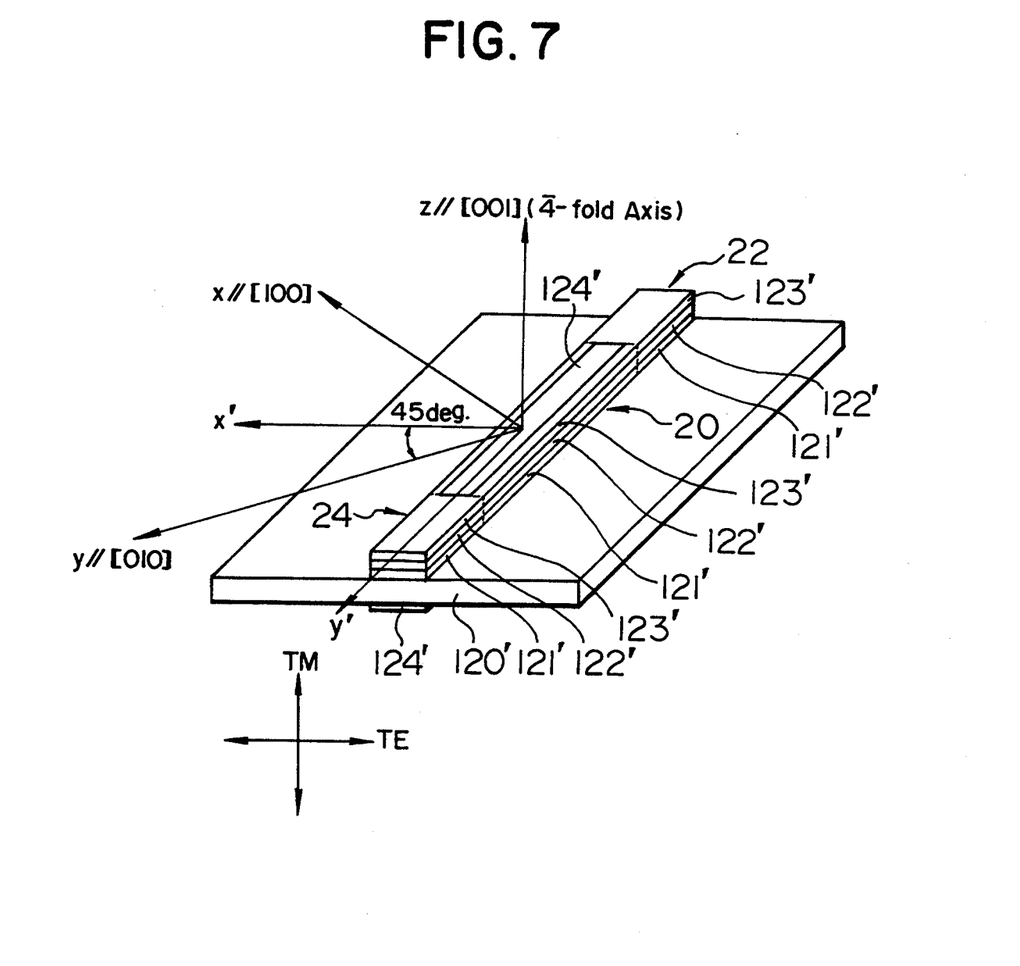
FIG. 7 shows another embodiment of the optical intensity modulator according to the present invention.

FIG. 7 shows another embodiment of an integrated optical intensity modulator. In this embodiment modulator, the quarter-wave plates 22 and 24 and optical modulating element 20 shown in FIG. 3A are formed on a same substrate 120'. The structure of optical modulating element 20 is similar to the optical modulating element 20 shown in FIG. 3B. The substrate 120', cladding layer 121', layer 122', cladding layer 123', and electrodes 124' shown in FIG. 7 correspond to the substrate 120, cladding layer 121, core layer 122, cladding layer 123, and electrodes 124 shown in FIG. 3B. However, the thickness of the core layer 122' and the waveguide length are different from those of the optical modulating element shown in FIG. 3B. The structure of the quarter-wave plates 22 and 24 of the embodiment shown in FIG. 7 is substantially the same as the optical modulating element 20, except for the waveguide length and the absence of the upper electrode 124'. The quarter-wave plates 22 and 24 use the phase shift amount between $TE_{00}$ and $TM_{00}$ modes. A phase shift amount of $\pi/4$ was obtained for the embodiment quarter-wave plates 22 and 24 at the waveguide length of about 37 $\mu$m. The modulation factor of the modulator was about 50%, and the feedback light intensity was about 0.5% of the incident light intensity.

The channel optical waveguide such as the quarter-wave plates 22 and 24 shown in FIG. 7 may be used in an optical integrated circuit as well as in an optical modulator, as an optical phase shifter, and the phase shift amount is not limited only to $\pi/4$.

In the embodiment shown in FIG. 7, the quarter-wave plates 22 and 24 as the phase shifter have the same structure as the optical modulating element 20 from the viewpoint of easy manufacture. However, the structure may be made different from that of the optical modulating element 20 so long as the channel optical waveguide has a core layer sandwiched between cladding layers and the core layer has $TM_{00}$ and $TE_{00}$ modes. For example, the channel optical waveguide may be manufactured by using insulating crystal such as lithium niobate and tantalum niobate.

What is claimed is:

1. An optical modulating element comprising:
   a core layer; and
   first and second cladding layers sandwiching said core layer,
   wherein said core layer and said first and second cladding layers constitute a waveguide for propagating light,
   said core layer is selected from the group consisting of (a) a superlattice layer made of a gallium arsenide layer and a mixed crystal layer of aluminum arsenide and gallium arsenide, said superlattice layer having a heterojunction parallel to the (001) plane of crystal, (b) a superlattice layer made of a mixed crystal layer of indium arsenide and gallium arsenide and a mixed crystal layer of indium arsenide and aluminum arsenide, said superlattice layer having a heterojunction parallel to the (001) plane of crystal, and (c) a superlattice layer made of a mixed crystal layer of indium arsenide and gallium arsenide and an indium phosphide layer, said superlattice layer having a heterojunction parallel to the (001) place of crystal,
   a difference between an index of refraction of said core layer and an index of refraction of said first cladding layer, a difference between the index of refraction of said core layer and an index of refraction of said second cladding layer, a thickness of said core layer and a width of said waveguide are set so that said core layer has $TM_{00}$ and $TE_{00}$ propagation modes, a direction of said waveguide is set to be parallel to the [110] or [−110] direction of crystal orientation so that the propagation direction of light of said $TM_{00}$ and $TE_{00}$ propagation modes is parallel to the [110] or [−110] direction of crystal orientation, and electrodes to apply an electrical field to said core layer in the direction parallel to the [001] direction of crystal orientation, wherein a difference between the index of refraction of said core layer when applying the electric field to said core layer and the index of refraction of said core layer when not applying the electric field to said core layer is different for said $Tm_{00}$ and $TE_{00}$ propagation modes.

2. An optical modulating element according to claim 1, wherein said first cladding layer is made of p-type semiconductor and said second cladding layer is made of n-type semiconductor, and wherein said core layer and said first and second cladding layers constitute a p-i-n structure.

3. An optical intensity modulator comprising:
   an optical modulating element;
   a first quarter-wave plate disposed on the light input side of said optical modulating element; and
   a circular dichroic polarizer disposed on the light output side of said optical modulating element, wherein
   said optical modulating element comprises a core layer and first and second cladding layers sandwiching said core layer,
   said core layer and said first and second cladding layers constitute a waveguide for propagating light,
   said core layer is made of one or more semiconductors belonging to a point group $\overline{4}3m$ or $\overline{4}2m$ by International symbol,
   a difference between an index of refraction of said core layer and an index of refraction of said first cladding layer, a difference between the index of refraction of said core layer and an index of refraction of said second cladding layer, a thickness of said core layer and a width of said waveguide are set so that said core layer has $TM_{00}$ and $TE_{00}$ propagation modes,
   a direction of said waveguide is set to be parallel to the [110] or [−110] direction of crystal orientation so that the propagation direction of light of said $TM_{00}$ and $TE_{00}$ propagation modes is parallel to the [110] or [−110] direction of crystal orientation, and
   electrodes to apply an electric field to said core layer in the direction parallel to the [001] direction of crystal orientation,
   wherein a difference between the index of refraction of said core layer when applying the electrical field to said core layer and the index of refraction of said core layer when not applying the electric field to said core later is different for said $TM_{00}$ and $TE_{00}$ propagation modes.

4. An optical intensity modulator according to claim 3, wherein said circular dichroic polarizer includes a second quarter-wave plate and a linear polarizer.

5. An optical intensity modulator according to claim 3, wherein said core layer is selected from the group consisting of (a) a superlattice layer made of a gallium arsenide layer and a mixed crystal layer of aluminum arsenide and gallium arsenide, said superlattice layer having a heterojunction parallel to the (001) plane of crystal, (b) superlattice layer made of a mixed crystal layer of indium arsenide and gallium arsenide and a mixed crystal layer of indium arsenide and aluminum arsenide, said superlattice layer having a heterojunction parallel to the (001) plane of crystal, and (c) a superlattice layer made of a mixed crystal layer of indium arsenide and gallium arsenide and an indium phosphide layer, said superlattice layer having a heterojunction parallel to the (001) plane of crystal.

6. An optical intensity modulator according to claim 3, wherein said first cladding layer is made of p-type semiconductor and said second cladding layer is made of n-type semiconductor, and wherein said core layer and said first and second cladding layers constitute a p-i-n structure.

7. An optical intensity modulator according to claim 4, further comprising a substrate on which said optical modulating element and said first and second quarter-wave plates are formed.

8. An optical intensity modulator according to claim 4, wherein:
   said first quarter-wave plate includes a second core layer and third and fourth cladding layers sandwiching said second core layer;
   said second core layer and said third and fourth cladding layers constituting a second waveguide for propagating light,
   a difference between an index of refraction of said second core layer and an index of refraction of said third cladding layer, a difference between the index of refraction of said second core layer and an index of refraction of said fourth cladding layer, a thickness of said second core layer and a width of said second waveguide are set so that said second core layer has $TM_{00}$ and $TE_{00}$ propagation modes,
   a ratio of the width of said second waveguide to the thickness of said second core layer is set so that a propagation constant of said $TM_{00}$ propagation modes is different from a propagation constant of said $TE_{00}$ propagation modes,
   a length of said second waveguide is set to that the difference between a phase of $TM_{00}$ light having passed through said second core layer and a phase of $TE_{00}$ length having passed through said second core layer has a predetermined value,
   said second quarter-wave plate includes a third core layer and fifth and sixth cladding layers sandwiching said third core layer;
   said third core layer and said fifth and sixth cladding layers constitute a third waveguide for propagating light,
   a difference between an index of refraction of said third core layer and an index of refraction of said fifth cladding layer, a difference between the index of refraction of said third core layer and an index of refraction of said sixth cladding layer, a thickness of said third core layer and a width of said third waveguide are set so that said third core layer has $TM_{00}$ and $TE_{00}$ propagation modes, a ratio of the width of said third waveguide to the thickness of said third core layer is set so that a propagation constant of said $TM_{00}$ propagation mode is different from a propagation constant of said $TE_{00}$ propagation mode, and a length of said third waveguide is set so that the difference between a phase of $TM_{00}$ light having passed through said third core layer and a phase of $TE_{00}$ light having passed through said third core layer has a predetermined value.

9. A phase plate of channel optical waveguide type comprising:

a core layer; and first and second cladding layers sandwiching said core layer, wherein said core layer and said first and second cladding layers constitute a waveguide for propagating light, a difference between an index of refraction of said core layer and an index of refraction of said first cladding layer, a difference between the index of refraction of said core layer and an index of refraction of said second cladding layer, a thickness of said core layer and a width of said waveguide are set so that said core layer has $TM_{00}$ and $TE_{00}$ propagation modes, a ratio of the width of said waveguide to the thickness of said core layer are set so that a propagation constant of said $TM_{00}$ propagation mode is different from a propagation constant of said $TE_{00}$ propagation modes, and a length of said waveguide is set so that the difference between a phase of $TM_{00}$ light having passed through said core layer and a phase of $TE_{00}$ light having passed through said core layer has a predetermined value.

* * * * *

UNITED STATES PATENT AND TRADEMARK OFFICE
CERTIFICATE OF CORRECTION

PATENT NO. : 5,351,320            Page 1 of 4

DATED : 27 September 1994

INVENTOR(S) : Tatsuo KANETAKE et al

It is certified that error appears in the above-identified patent and that said Letters Patent is hereby corrected as shown below:

On the title page, item [54] "THEREFORE" should read --THEREFOR--.

IN THE ABSTRACT, Line 3: After "or" insert --more--.
(Item 57)         Line 4: Change "$\overline{43}m$ or $\overline{42}m$" to --$\overline{4}3m$ or $\overline{4}2m$--.

Line 5: Change "The direction" to --The propagation direction--.

| Column | Line | |
|---|---|---|
| 1 | 5 | Change "THEREFORE" TO --THEREFOR--. |
| 1 | 36 | Change "cf" to --of--. |
| 1 | 45 | Change "W" to --W.,--. |
| 1 | 66 | Change "in absorption" to --in the absorption--. |
| 2 | 2 | After "limit" insert --of--. |
| 2 | 57 | Change "$\overline{43}m$ or $\overline{42}m$" to --$\overline{4}3m$ or $\overline{4}2m$--. |

UNITED STATES PATENT AND TRADEMARK OFFICE
CERTIFICATE OF CORRECTION

PATENT NO. : 5,351,320

DATED : 27 September 1994

INVENTOR(S) : Tatsuo KANETAKE et al

It is certified that error appears in the above-identified patent and that said Letters Patent is hereby corrected as shown below:

| Column | Line | |
|---|---|---|
| 2 | 63 | Change "[001 ]direction" to --[001] direction--. |
| 3 | 11 | Change "[001 ]direction" to --[001] direction--. |
| 3 | 14 | Change "[001 ]direction" to --[001] direction--. |
| 3 | 27 | Change "$\overline{4}3m$ or $\overline{4}2m$," to --$\overline{4}3m$ or $\overline{4}2m$,--. |
| 3 | 34 | Change "motes." to --modes.--. |
| 3 | 39 | After "embodiment" insert --of the--. |
| 3 | 61 | After "length" insert --of the--. |

UNITED STATES PATENT AND TRADEMARK OFFICE
CERTIFICATE OF CORRECTION

PATENT NO. : 5,351,320

DATED : 27 September 1994

INVENTOR(S) : Tatsuo KANETAKE et al

It is certified that error appears in the above-identified patent and that said Letters Patent is hereby corrected as shown below:

| Column | Line | |
|---|---|---|
| 4 | 48 | Change "$\overline{43}m$" to --$\bar{4}3m$--. |
| 4 | 49 | Change "$\overline{42}m$" to --$\bar{4}2m$--. |
| 4 | 57 | Change "$\overline{43}m$ or $\overline{42}m$" to --$\bar{4}3m$ or $\bar{4}2m$--. |
| 5 | 3 | Change "$\overline{42}m$" to --$\bar{4}2m$--; change ".as" to --as--. |
| 5 | 27 | Change "$\overline{43}m$ or $\overline{42}m$." to --$\bar{4}3m$ or $\bar{4}2m$.--. |
| 5 | 41 | Change "$\overline{42}m$" to --$\bar{4}2m$--. |
| 5 | 48 | Change "$D_{2d}(\overline{42}m)$" to --$D_{2d}(\bar{4}2m)$--. |
| 5 | 58 | Change "$D_{2d}(\overline{42}m)$" to --$D_{2d}(\bar{4}2m)$--. |
| 5 | 64 | Change "$\overline{43}m$" to --$\bar{4}3m$--. |
| 5 | 65 | After "components" insert --in--. |

UNITED STATES PATENT AND TRADEMARK OFFICE
CERTIFICATE OF CORRECTION

PATENT NO. : 5,351,320
DATED : 27 September 1994
INVENTOR(S) : Tatsuo KANETAKE et al It is certified that error appears in the above-identified patent and that said Letters Patent is hereby corrected as shown below:

| Column | Line | |
|---|---|---|
| 6 | 5 | Change "$\overline{43m}$" to --$\overline{4}3m$--. |
| 8 | 29 | Change "illustrates" to --illustrate--. |
| 9 | 29 | After "improved" insert --to--. |
| 12 | 10 | Before "layer" insert --core--. |
| 14 | 53 | Change "length" to --light--. |

Signed and Sealed this

Eighteenth Day of April, 1995

*Attest:*

BRUCE LEHMAN

*Attesting Officer*   *Commissioner of Patents and Trademarks*